(12) United States Patent
Li et al.

(10) Patent No.: US 12,235,152 B2
(45) Date of Patent: Feb. 25, 2025

(54) METHOD FOR ESTIMATING STRUCTURAL VIBRATION IN REAL TIME

(71) Applicant: Tsinghua University, Beijing (CN)

(72) Inventors: Yan-Fu Li, Beijing (CN); Min Qian, Beijing (CN); Shang Xiong, Beining (CN)

(73) Assignee: TSINGHUA UNIVERSITY, Beijing (CN)

( * ) Notice: Subject to any disclaimer, the term of this patent is extended or adjusted under 35 U.S.C. 154(b) by 270 days.

(21) Appl. No.: 17/897,744

(22) Filed: Aug. 29, 2022

(65) Prior Publication Data

US 2023/0066703 A1   Mar. 2, 2023

(30) Foreign Application Priority Data

Sep. 2, 2021   (CN) .......................... 202111026403.X

(51) Int. Cl.
    G01H 9/00   (2006.01)
(52) U.S. Cl.
    CPC .................................... G01H 9/00 (2013.01)
(58) Field of Classification Search
    CPC ....................................................... G01H 9/00
    See application file for complete search history.

(56) References Cited

U.S. PATENT DOCUMENTS

| | | | | |
|---|---|---|---|---|
| 2010/0262390 | A1* | 10/2010 | Caicedo | G01V 1/003 702/56 |
| 2012/0130693 | A1* | 5/2012 | Ertas | E21B 44/00 703/2 |
| 2018/0136085 | A1* | 5/2018 | Lochry | G01M 5/0091 |

FOREIGN PATENT DOCUMENTS

| | | |
|---|---|---|
| CN | 1566907 A | 1/2005 |
| CN | 101051217 A | 10/2007 |

(Continued)

OTHER PUBLICATIONS

Bin: Research on Optimal Sensor Placement of Health Monitoring on Large Span Space Grid Structures, Dissertation, Qiandao University of Technology, Dec. 18, 2017.

Corradi et al.: Performances of the double modal synthesis for the prediction of the transient self-sustained vibration and squeal noise. Applied Acoustics 175 (2021).

(Continued)

*Primary Examiner* — Isam A Alsomiri
*Assistant Examiner* — Abdallah Abulaban
(74) *Attorney, Agent, or Firm* — Woodard, Emhardt, Henry, Reeves & Wagner, LLP

(57) ABSTRACT

A method for estimating structural vibration in real time includes steps described below. A to-be-estimated measuring point of a to-be-measured structure is acquired, and at least one target measuring point associated with the to-be-estimated measuring point is determined; coordinates corresponding to each target measuring point of the at least one target measuring point, a target mode corresponding to the each target measuring point and a target vibration parameter corresponding to the each target measuring point are determined; a mode vibration parameter of the to-be-estimated measuring point and an interpolation vibration parameter of the to-be-estimated measuring point are determined based on the to-be-estimated measuring point and in combination with the target mode, the target vibration parameter and the coordinates of the each target measuring point; and an estimated vibration parameter of the to-be-estimated measuring point is determined according to the mode vibration parameter and the interpolation vibration parameter.

16 Claims, 4 Drawing Sheets

(56) References Cited

FOREIGN PATENT DOCUMENTS

| | | |
|---|---|---|
| CN | 101957601 A | 1/2011 |
| CN | 102575516 A | 7/2012 |
| CN | 103335858 A | 10/2013 |
| CN | 105043770 A | 11/2015 |
| CN | 107220403 A | 9/2017 |
| CN | 107741312 A | 2/2018 |
| CN | 108228958 A | 6/2018 |
| CN | 109883379 A | 6/2019 |
| CN | 109918614 A | 6/2019 |
| CN | 110032776 A | 7/2019 |
| CN | 110375690 A | 10/2019 |
| CN | 113049217 A | 6/2021 |
| JP | H02134531 A | 5/1990 |
| JP | 2018022290 A | 2/2018 |
| KR | 20180055002 A | 5/2018 |

OTHER PUBLICATIONS

Gong et al: Damage Identification of Urban Overpass Based on Modal Frequency and Genetic Neural Network, 2011 International Conference of TMEE, Changchun China.

Jiang: Research status and prospect of health monitoring railway station structures, China Safety Science Journal, vol. 30, Supp. 1, Dec. 2020, pp. 71-76.

Li et al: Piezoelectric multi-mode vibration control of stiffened plate using active disturbance rejection method, Control Theory & Application, vol. 30, No. 12, Dec. 2013.

Li et al: The Outlier and Integrity Detection of Rail Profile Based on Profile Registration, IEEE Transactions on Intelligent Transportation Systems, 2019.

Office Action in CN202111026403.X mailed Oct. 19, 2021.

* cited by examiner

METHOD FOR ESTIMATING STRUCTURAL VIBRATION IN REAL TIME

CROSS-REFERENCE TO RELATED APPLICATION

This application claims priority to Chinese Patent Application No. 202111026403.X, filed on Sep. 2, 2021, the disclosure of which is incorporated herein by reference in its entirety.

TECHNICAL FIELD

Embodiments of the present disclosure relate to the technical field of vibration estimation, in particular, to a method for estimating structural vibration in real time.

BACKGROUND

Vibration is a form expressed by the structure under external excitation, and any excitation will cause structural vibration. Various kinds of structural vibration may occur during the operation of all large-scale equipment. If the amplitude of the structural vibration is relatively large, the corresponding components or equipment may be damaged, and serious or even irreparable damage such as fractures may be caused, which is particularly common in the fields such as aerospace, wind energy, road transportation, railway transportation and sea transportation. Through the vibration estimation, the preventive maintenance can be effectively carried out. The structural vibration of the equipment to be operated is obtained in advance, so as to prevent unpredictable structural vibration accidents under the traditional technical means, evaluate the working state of the equipment and perform troubleshooting on the vibration, which is of great significance for ensuring the safe and stable operation of the equipment.

However, most of the structural vibration estimation is not performed on the equipment, and thus real-time estimation cannot be achieved. As a result, it will take a long time from getting the estimation result to feeding the result back to the corresponding equipment users, which brings a certain safety risk to the equipment and the personnel on the equipment.

SUMMARY

The present disclosure provides a method for estimating structural vibration in real time to achieve the real-time estimation of the vibration parameter of the structure.

In a first aspect, embodiments of the present disclosure provide a method for estimating structural vibration in real time. The method for estimating structural vibration in real time includes steps described below.

A to-be-estimated measuring point of a to-be-measured structure is acquired, and at least one target measuring point associated with the to-be-estimated measuring point is determined.

Coordinates corresponding to each target measuring point of the at least one target measuring point, a target mode corresponding to the each target measuring point and a target vibration parameter corresponding to the each target measuring point are determined.

A mode vibration parameter of the to-be-estimated measuring point and an interpolation vibration parameter of the to-be-estimated measuring point are determined based on the to-be-estimated measuring point and in combination with the target mode of the each target measuring point, the target vibration parameter of the each target measuring point and the coordinates of the each target measuring point.

An estimated vibration parameter of the to-be-estimated measuring point is determined according to the mode vibration parameter and the interpolation vibration parameter.

In a second aspect, the embodiments of the present disclosure further provide an apparatus for estimating structural vibration in real time. The apparatus for estimating structural vibration in real time includes a measuring point determination module, a parameter acquisition module, a vibration parameter determination module and an estimated parameter determination module.

The measuring point determination module is configured to acquire a to-be-estimated measuring point of a to-be-measured structure, and determine at least one target measuring point associated with the to-be-estimated measuring point.

The parameter acquisition module is configured to acquire coordinates corresponding to each target measuring point of the at least one target measuring point, a target mode corresponding to the each target measuring point and a target vibration parameter corresponding to the each target measuring point.

The vibration parameter determination module is configured to determine a mode vibration parameter of the to-be-estimated measuring point and an interpolation vibration parameter of the to-be-estimated measuring point based on the to-be-estimated measuring point and in combination with the target mode of the each target measuring point, the target vibration parameter of the each target measuring point and the coordinates of the each target measuring point.

The estimated parameter determination module is configured to determine an estimated vibration parameter of the to-be-estimated measuring point according to the mode vibration parameter and the interpolation vibration parameter.

In a third aspect, the embodiments of the present disclosure further provide a computer device. The computer device includes one or more processors and a memory configured to store one or more programs.

The one or more programs, when executed by the one or more processors, cause the one or more processors to implement the method for estimating structural vibration in real time according to any embodiment of the present disclosure.

In a fourth aspect, the embodiments of the present disclosure further provide a computer-readable storage medium storing computer programs which, when executed by a processor, implement the method for estimating structural vibration in real time according to any embodiment of the present disclosure.

The embodiments of the present disclosure provide a method and apparatus for estimating structural vibration in real time, a device and a storage medium. In the method, the to-be-estimated measuring point of the to-be-measured structure is acquired, and the target measuring point associated with the to-be-estimated measuring point is determined; the coordinates corresponding to the each target measuring point, the target mode corresponding to the each target measuring point and the target vibration parameter corresponding to the each target measuring point are acquired; the mode vibration parameter of the to-be-estimated measuring point and the interpolation vibration parameter of the to-be-estimated measuring point are determined based on the to-be-estimated measuring point and in combination with the target mode of the each target measuring point, the target vibration parameter of the each target measuring point and the coordinates of the each target measuring point; and the estimated vibration parameter of the to-be-estimated measuring point is determined according to the mode vibration parameter and the interpolation vibration parameter. Through this method, the problem is solved that the vibration parameter cannot be estimated in real time through the vibration parameter estimation method in the related art. The target measuring point associated with the to-be-estimated measuring point is determined, the mode vibration parameter of the to-be-estimated measuring point and the interpolation vibration parameter of the to-be-estimated measuring point are estimated according to the coordinates of the target measuring point, the target mode of the target measuring point and the target vibration parameter of the target measuring point, and comprehensive data processing is performed on the mode vibration parameter and the interpolation vibration parameter to obtain the estimated vibration parameter of the to-be-estimated measuring point. In this manner, the purpose of real-time estimation of the vibration parameter of the to-be-estimated measuring point according to the vibration parameter of the associated target measuring point is achieved, and thus the estimated vibration parameter of the to-be-estimated measuring point can be estimated in real time, so that the timeliness and accuracy of data are ensured, the data processing time is saved, the reaction speed is improved, and the safety of the equipment is ensured.

DETAILED DESCRIPTION

To illustrate the purpose, technical solution and advantages of the present application more clearly, embodiments of the present application are further described in detail below. It is to be understood that the described embodiments are merely part, not all, of embodiments of the present application. Based on the embodiments of the present application, all other embodiments obtained by those of ordinary skill in the art without creative work are within the scope of the present application.

When the description below refers to the drawings, the same numerals in different drawings represent the same or similar elements unless otherwise expressed. Implementations described in example embodiments below do not represent all implementations consistent with the present application. Conversely, these implementations are merely examples of the apparatus and method that are consistent with some aspects of the present application as detailed in the appended claims.

In the description of the present application, it is to be understood that the terms "first", "second", "third" and the like are merely used for distinguishing between similar objects and not necessarily for describing a particular order or sequence, nor for indicating or implying relative importance. For those of ordinary skill in the art, specific meanings of the preceding terms in the present application may be construed according to specific circumstances. Moreover, in the description of the present application, unless otherwise noted, the term "a plurality of" or "multiple" refers to two or more. "And/or" is used for describing an association between associated objects and indicates three relations, for example, "A and/or B" may indicate the presence of A alone, the presence of both A and B and the presence of B alone. The symbol "I" generally indicates an "or" relation between associated objects.

Embodiment One

Figure 1:
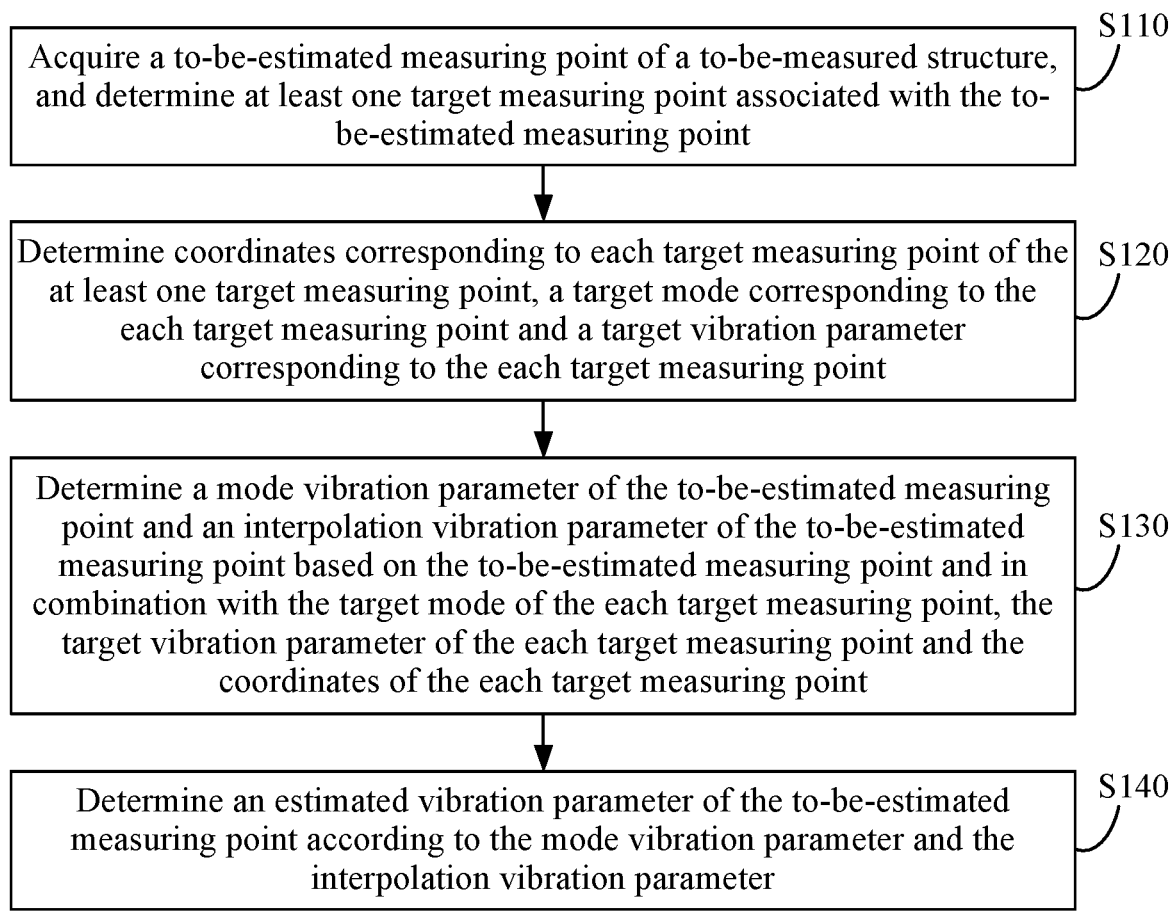
FIG. 1 is a flowchart of a method for estimating structural vibration in real time according to embodiment one of the present disclosure.

FIG. 1 is a flowchart of a method for estimating structural vibration in real time according to embodiment one of the present disclosure. The method is applicable to the case of estimating the vibration parameter of a structure. The method may be executed by a computer device, which may be composed of two or more physical entities or of one physical entity. Generally, the computer device may be a laptop, a desktop computer, a smart tablet and the like.

As shown in FIG. 1, the method for estimating structural vibration in real time provided in embodiment one includes steps described below.

In S110, a to-be-estimated measuring point of a to-be-measured structure is acquired, and at least one target measuring point associated with the to-be-estimated measuring point is determined.

In the embodiment, the to-be-measured structure may be understood as a hardware structure having a requirement of vibration parameter estimation, for example, an aircraft. The vibration parameter may be a parameter that measures the vibration, such as displacement and acceleration. The to-be-estimated measuring point may be understood as a measuring point, on the to-be-measured structure, where the vibration parameter needs to be estimated. The target measuring point may be understood as a measuring point which affects the vibration parameter of the to-be-estimated measuring point.

It is to be understood that since each point can only be provided with one type of sensors, one kind of vibration parameters are collected from each point on the to-be-measured structure. However, due to the limitation of conditions (for example, a certain measuring point cannot install a sensor), vibration parameters of some measuring points cannot be acquired, so that it is necessary to estimate the vibration parameter of the measuring point. When the vibration parameter is estimated, since vibration parameters are different types of parameters, vibration parameters affecting each type of vibration parameter may be different, so that it is necessary to predetermine the type of at least one vibration parameter associated with the each type of vibration parameter. That is, for each measuring point, it is necessary to determine other measuring points associated with the each measuring point, and establish an association relationship between the measuring points.

For example, the to-be-estimated measuring point, on the to-be-measured structure, where the vibration parameter needs to be estimated is acquired, and the to-be-estimated measuring point may be represented by position coordinates. The to-be-estimated measuring point is known, and the type of the estimated vibration parameter of the to-be-estimated measuring point is also determined. When the vibration estimation is performed, the target measuring point is selected according to the to-be-estimated measuring point requiring estimation and the predetermined association relationship. In this case, one or more target measuring points may exist.

In S120, coordinates corresponding to each target measuring point of the at least one target measuring point, a target mode corresponding to the each target measuring point and a target vibration parameter corresponding to the each target measuring point are determined.

In the embodiment, the target mode may be understood as a mode of the target measuring point, and orders of the target mode may be set according to requirements. The present application takes a four-order mode as an example. The target vibration parameter may be understood as the vibration parameter of the target measuring point.

It is to be noted that in the present application, when the vibration parameter of the to-be-estimated measuring point is estimated and various types of data corresponding to the target measuring point are acquired, data of each target measuring point at the same moment is acquired, and the estimated vibration parameter of the to-be-estimated measuring point is also data at this moment, so that real-time estimation can be achieved. The device for implementing the method for estimating structural vibration in real time provided in the present application may be installed in a device corresponding to the to-be-measured structure. For example, if the to-be-measured structure is an aircraft, the method of the present application may be integrated in a computer device, and then the computer device is installed on the aircraft.

For example, once the target measuring point is determined, the coordinates corresponding to the target measuring point are also determined. Since the target vibration parameter is collected in real time through a device such as a sensor, the target vibration parameter may be acquired from a storage space or a database. The to-be-measured structure is simulated through a model, and then the mode of each point on the to-be-measured structure can be obtained. After the target measuring point is determined, the target mode corresponding to the target measuring point may be determined according to the model. The coordinates corresponding to each target measuring point, the target mode corresponding to the each target measuring point and the target vibration parameter corresponding to the each target measuring point are determined. The coordinates may be two-dimensional coordinates, three-dimensional coordinates or higher-dimensional coordinates.

In S130, a mode vibration parameter of the to-be-estimated measuring point and an interpolation vibration parameter of the to-be-estimated measuring point are determined based on the to-be-estimated measuring point and in combination with the target mode of the each target measuring point, the target vibration parameter of the each target measuring point and the coordinates of the each target measuring point.

In the embodiment, the mode vibration parameter may be understood as a vibration parameter obtained by estimating the vibration parameter of the to-be-estimated measuring point by means of modal superposition. The interpolation vibration parameter is a vibration parameter obtained by estimating the vibration parameter of the to-be-estimated measuring point by means of interpolation calculation.

For example, for the to-be-estimated measuring point, mode superposition estimation is performed according to the mode of the to-be-estimated measuring point and in combination with each target mode and each target vibration parameter, and then the mode vibration parameter of the to-be-estimated measuring point is calculated; interpolation calculation is performed according to the coordinates of the to-be-estimated measuring point and in combination with the coordinates of each target measuring point and the target vibration parameter of the each target measuring point to obtain the interpolation vibration parameter.

In S140, an estimated vibration parameter of the to-be-estimated measuring point is determined according to the mode vibration parameter and the interpolation vibration parameter.

In the embodiment, the estimated vibration parameter may be understood as the vibration parameter corresponding to the to-be-estimated measuring point which is estimated according to the target measuring point. Through comprehensive processing, such as getting the maximum value, minimum value, average value, or weighted sum, on the mode vibration parameter and the interpolation vibration parameter, the estimated vibration parameter of the to-be-estimated measuring point is calculated.

The embodiment of the present disclosure provides the method for estimating structural vibration in real time. According to the method, the to-be-estimated measuring point of the to-be-measured structure is acquired, and the at least one target measuring point associated with the to-be-estimated measuring point is determined; the coordinates corresponding to the each target measuring point, the target mode corresponding to the each target measuring point and the target vibration parameter corresponding to the each target measuring point are determined; the mode vibration parameter of the to-be-estimated measuring point and the interpolation vibration parameter of the to-be-estimated measuring point are determined based on the to-be-estimated measuring point and in combination with the target mode of the each target measuring point, the target vibration parameter of the each target measuring point and the coordinates of the each target measuring point; and the estimated vibration parameter of the to-be-estimated measuring point is determined according to the mode vibration parameter and the interpolation vibration parameter. Through this method, the problem is solved that the vibration parameter cannot be estimated in real time through the vibration parameter estimation method in the related art. The target measuring point associated with the to-be-estimated measuring point is determined, the mode vibration parameter of the to-be-estimated measuring point and the interpolation vibration parameter of the to-be-estimated measuring point are determined according to the coordinates of the target measuring point, the target mode of the target measuring point and the target vibration parameter of the target measuring point, and then the estimated vibration parameter of the to-be-estimated measuring point is obtained. In this manner, the purpose of real-time estimation of the vibration parameter of the to-be-estimated measuring point according to the vibration parameter of the associated target measuring point is achieved, and the estimated vibration parameter of the to-be-estimated measuring point can be estimated in real time, so that the timeliness and accuracy of the data are ensured, the data processing time is saved, the reaction speed is improved and the safety of the equipment is ensured. The vibration parameter is estimated by different manners simultaneously, and two estimation results, that is, the mode vibration parameter and the interpolation vibration parameter, are obtained. Then, a comprehensive operation is performed on the two estimation results to obtain the final estimated vibration parameter, and thus the result is more accurate.

Embodiment Two

Figure 2:
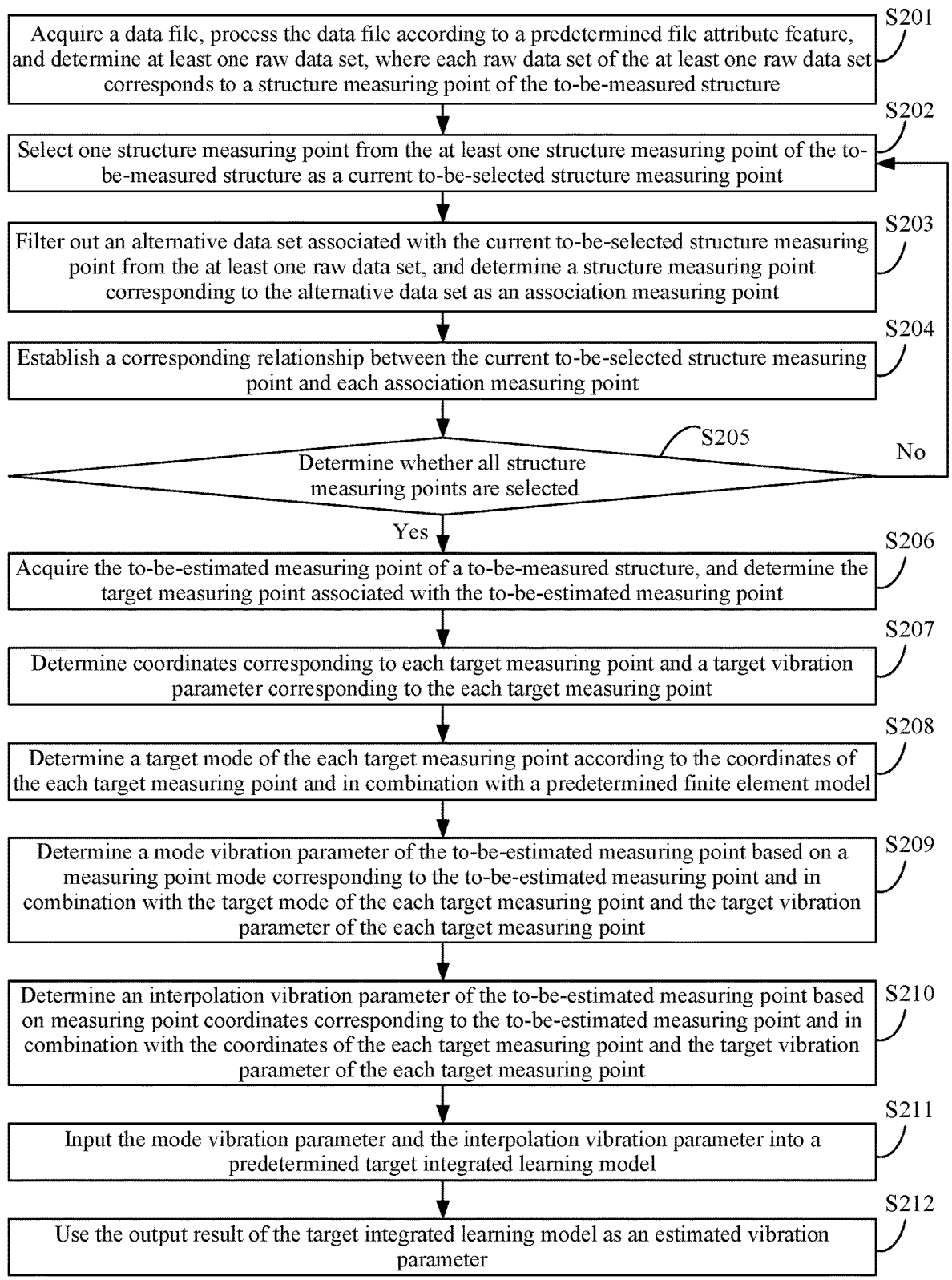
FIG. 2 is a flowchart of a method for estimating structural vibration in real time according to embodiment two of the present disclosure.

FIG. 2 is a flowchart of a method for estimating structural vibration in real time according to embodiment two of the present disclosure. The technical solution of the embodiment is further specified based on the preceding technical solution, and for example mainly includes steps described below.

In S201, a data file is acquired, the data file is processed according to a predetermined file attribute feature, and at least one raw data set is determined, where each raw data set of the at least one raw data set corresponds to a structure measuring point of the to-be-measured structure.

In the embodiment, the data file may be understood as a file storing raw data. Raw data refers to data of the structure in various environments in engineering applications, and may be collected by a sensor. The file attribute feature may be understood as a format feature such as the position where data is stored in the file and the volume of the data. For example, the first byte stores the data type, the second byte stores the specific data content, etc. The raw data set may be understood as a set composed of raw data. The raw data in the application refers to the vibration parameter. The structure measuring point may be understood as a coordinate point (the measuring point) in the to-be-measured structure.

For example, when the raw data is stored in the data file, the file attribute feature for the storage of the file is preset. Therefore, the raw data is stored according to a certain feature rule when being stored. The data file is acquired, data in the data file is parsed according to the file attribute feature, and then various parts of raw data is acquired. The raw data is classified according to different structure measuring points (each structure measuring point corresponds to a data type, and therefore it may also be understood as that the raw data is classified according to data types), and the raw data of the same structure measuring point is stored in the same raw data set. When the raw data is read from the data file, if the volume of the raw data is too large, undersampling may be used for processing to obtain some data at regular intervals, so as to reduce the data volume.

In S202, one structure measuring point is selected from the at least one structure measuring point of the to-be-measured structure as a current to-be-selected structure measuring point.

In the embodiment, the current to-be-selected structure measuring point may be understood as a structure measuring point, among the structure measuring points, for which correlation measuring point determination needs to be performed. Any structure measuring point may be selected from the structure measuring points of the to-be-measured structure as the current to-be-selected structure measuring point; or structure measuring points may be selected in turn from front to back (or from back to front) in a certain sequence as the current to-be-selected structure measuring point. The structure measuring points in the to-be-measured structure may be arranged according to the sequence of coordinates, or may be sequenced according to types of the collected vibration parameters.

In S203, an alternative data set associated with the current to-be-selected structure measuring point is filtered out from the at least one raw data set, and a structure measuring point corresponding to the alternative data set is determined as an association measuring point.

In the embodiment, the alternative data set may be understood as a set storing the vibration parameter associated with the current to-be-selected structure measuring point. The association measuring point may be understood as a structure measuring point having a certain correlation with the current to-be-selected structure measuring point.

Since one type of vibration parameter is collected at each structure measuring point, each structure measuring point corresponds to a certain volume of data of the vibration parameter. The correlation degree of the vibration parameter set corresponding to the current to-be-selected structure measuring point and the raw data sets is calculated, and the raw data set having a relatively high correlation degree is selected as the alternative data set. The structure measuring point of collected data in the alternative data set is the association measuring point.

In an optional embodiment of the embodiment, the filtering of the alternative data set associated with the current to-be-selected structure measuring point from the at least one raw data set includes A1 to A5.

In A1, a to-be-selected raw data set corresponding to the current to-be-selected structure measuring point is determined, and a measuring point raw data set corresponding to each of remaining structure measuring points is determined.

In the embodiment, the to-be-selected raw data set may be understood as a data set of the vibration parameter collected at the current to-be-selected structure measuring point. The measuring point raw data set may be understood as a data set of the vibration parameter collected at a structure measuring point which is not selected.

For example, when the vibration parameter is collected at each structure measuring point, vibration parameters collected at different structure measuring points may be stored according to the structure measuring points or parameter types respectively, and at this moment, only the structure measuring points or parameter types corresponding to the data set need to be specified; or when each vibration parameter is stored, the structure measuring point or parameter type corresponding to the each vibration parameter is separately stored. After the current to-be-selected structure measuring point is determined, the type of the vibration parameter corresponding to the current to-be-selected structure measuring point is also determined, and the to-be-selected raw data set corresponding to the current to-be-selected structure measuring point can be determined from various parameter sets according to the structure measuring point or the corresponding parameter type. Similarly, the measuring point raw data set corresponding to each of remaining structure measuring points is determined in the preceding manner.

In A2, data in the to-be-selected raw data set is aligned with data in the measuring point raw data set.

The data in the to-be-selected raw data set and the data in the measuring point raw data set are unified in terms of a time unit and a data volume, so as to ensure that the data is in one-to-one correspondence; and the initial first part of data is aligned to achieve data alignment.

In an optional embodiment of the embodiment, the alignment of the data in the to-be-selected raw data set and the data in each measuring point raw data set includes steps described below. For the measuring point raw data set, a unit of a timestamp of the data in the to-be-selected raw data set and a unit of a timestamp of the data in the measuring point raw data set are unified; timestamp matching is performed on the data in the to-be-selected raw data set and the data in the measuring point raw data set; and the volume of the data in the matched to-be-selected raw data set and the volume of the data in the matched measuring point raw data set are adjusted to be the same, and the data in the matched to-be-selected raw data set is sequentially aligned with the data in the matched measuring point raw data set.

For example, the unit of the timestamp of all data in the to-be-selected raw data set and the unit of the timestamp of all data in the measuring point raw data set are unified, for example, are expressed as numerical values in milliseconds. For different types of vibration parameters, since different collection frequencies exist, the volume of the data in the to-be-selected raw data set and the volume of the data in the measuring point raw data set may be different. According to whether sampling frequencies are the same, data alignment may be performed in two manners, that is, at the same sampling frequency or at different sampling frequencies. For data alignment at the same sampling frequency, when it is determined that the first timestamps of two vibration parameters are equal, it is indicated that the timestamp matching is completed. Successful matching at the first timestamp means that the timestamp matching is completed, that is, the data alignment is completed, and the remaining data is sequentially aligned one by one according to the arrangement sequence of the data. For data alignment at different sampling frequencies, one manner is to perform copying and filling on the vibration parameter obtained at a relatively low sampling frequency according to the value of the timestamp; for example, the average value, maximum value, minimum value, median value and mode of data within a period of time are calculated, and the obtained data is used as the vibration parameter at the corresponding time point. Another manner is to perform information compression on the vibration parameter obtained at a relatively high sampling frequency, and the information compression manner is to extract feature values within a period of time; for example, the average value of data within the first second to the third second is calculated as the vibration parameter at the corresponding time point. After the volume of the data in the to-be-selected raw data set and the volume of the data in the measuring point raw data set are adjusted to be the same in the preceding two manners, the remaining data is sequentially aligned one by one according to the arrangement sequence of the data.

Exemplarily, timestamps of vibration parameters in the to-be-selected raw data set are sequentially as: 10: 00: 00: 00 May 7, 2021, 10: 00: 00: 10 May 7, 2021, 10: 00: 00: 20 May 7, 2021, . . . ; timestamps of vibration parameters in the measuring point raw data set are sequentially as: 10: 00: 00: 10 May 7, 2021, 10: 00: 00: 20 May 7, 2021, 10: 00: 00: 30 May 7, 2021, . . . . Matching of timestamp 10: 00: 00: 10 May 7, 2021 is completed, and this timestamp is used as the start to perform data volume adjustment and data alignment for subsequent data. Each part of data is arranged in a time sequence, and after the volume of data is adjusted to be the same, starting from the first vibration parameter, each vibration parameter has a corresponding vibration parameter of another type.

It is to be understood that the effect of data alignment is to find the corresponding vibration parameter for each vibration parameter to facilitate subsequent correlation calculation.

In A3, a correlation coefficient of the aligned to-be-selected raw data set and the aligned measuring point raw data set is determined.

The correlation coefficient of the to-be-selected raw data set and the each measuring point raw data set is calculated through the vibration parameter in the aligned to-be-selected raw data set and the vibration parameter in the each measuring point raw data set. In the present application, a linear correlation coefficient, for example, the Pearson correlation coefficient, is used when the correlation coefficient is calculated, so that the calculation result is more accurate.

In A4, a preset number of alternative correlation coefficients are filtered out from correlation coefficients.

In the embodiment, the alternative correlation coefficient may be understood as a correlation coefficient having the highest correlation degree selected from the correlation coefficients, which can better reflect the correlation between vibration parameters collected at the current to-be-selected structure measuring point. A preset requirement may be that a certain number of correlation coefficients are selected. For example, 20 correlation coefficients are selected according to correlation from high to low as alternative correlation coefficients, or correlation coefficients greater than a certain threshold are selected; for example, correlation coefficients greater than 0.4 are selected from the correlation coefficients as alternative correlation coefficients, or alternative correlation coefficients satisfying the preset requirement are comprehensively selected considering the preceding two conditions.

In A5, a measuring point raw data set corresponding to the preset number of alternative correlation coefficients is used as the alternative data set.

Each alternative correlation coefficient corresponds to a measuring point raw data set, the measuring point raw data set corresponding to each alternative correlation coefficient is determined, and the each measuring point raw data set is used as the alternative data set.

In S204, a corresponding relationship between the current to-be-selected structure measuring point and each association measuring point is established.

The corresponding relationship is established between the current to-be-selected structure measuring point and the association measuring point associated with the current to-be-selected structure measuring point, and the corresponding relationship may be stored in a relationship table; or the relationship between the current to-be-selected structure measuring point and the association measuring point may also be recorded in other manners.

In S205, whether all structure measuring points are selected is determined. If all structure measuring points are selected, S206 is executed; if not all structure measuring points are selected, S202 is returned to and executed.

Whether all structure measuring points are selected is determined. If all structure measuring points are selected, association measuring points corresponding to all structure measuring points are all determined; if not all structure measuring points are selected, it is indicated that association measuring points of some structure measuring points are not determined, and the step for selecting the current to-be-selected structure measuring point is returned to for the continuous determination of the association measuring point. After association measuring points corresponding to all structure measuring points are all determined, other vibration parameters corresponding to each type of vibration parameter are obtained, that is, other structure measuring points corresponding to each structure measuring point are obtained, so as to subsequently determine a target measuring point associated with a to-be-estimated measuring point.

In S206, the to-be-estimated measuring point of a to-be-measured structure is acquired, and the target measuring point associated with the to-be-estimated measuring point is determined.

In S207, coordinates corresponding to each target measuring point and a target vibration parameter corresponding to the each target measuring point are determined.

In S208, a target mode of the each target measuring point is determined according to the coordinates of the each target measuring point and in combination with a predetermined finite element model.

In the embodiment, the finite element model may be understood as a model established when a finite element analysis method is applied. Finite element analysis is carried out according to the structure, material and other parameters of the to-be-measured structure, and the finite element model is established. The coordinates of the each target measuring point are substituted into the predetermined finite element model, and the target mode of the each target measuring point is obtained through model analysis.

In S209, a mode vibration parameter of the to-be-estimated measuring point is determined based on a measuring point mode corresponding to the to-be-estimated measuring point and in combination with the target mode of the each target measuring point and the target vibration parameter of the each target measuring point.

In the embodiment, the measuring point mode may be understood as the mode of the to-be-estimated measuring point, and the order of the measuring point mode is the same as the order of the target mode.

For example, linear regression calculation is performed on the target mode and the target vibration parameter to obtain the relevant parameter of the linear regression, and then the mode vibration parameter is calculated according to the relevant parameter of the linear regression and the measuring point mode.

In an optional embodiment of the embodiment, the determination of the mode vibration parameter of the to-be-estimated measuring point based on the measuring point mode corresponding to the to-be-estimated measuring point and in combination with the target mode of the each target measuring point and the target vibration parameter of the each target measuring point includes steps described below.

In B1, linear regression calculation is performed according to each target mode and each target vibration parameter and in combination with a given regression equation expression to determine a linear regression parameter.

In the embodiment, the linear regression parameter may be understood as a parameter of a regression equation, for example, a linear regression coefficient, an offset, etc. In the embodiment, a four-order target mode is taken as an example, and the corresponding regression equation expression may be that $Y=W_1 X_{n1}+W_2 X_{n2}+W_3 X_{n3}+W_4 X_{n4}+a$, where Y represents the vibration parameter, $W_1$ to $W_4$ and a represent linear regression parameters, $W_1$ to $W_4$ represent linear regression coefficients, a represents an offset, and $X_{n1}$ to $X_{n4}$ represent modes of the n-th structure measuring point. For each target measuring point, the corresponding target mode and the corresponding target vibration parameter are substituted into corresponding parameter positions in the regression equation expression, and linear regression calculation is performed according to target modes and target vibration parameters corresponding to multiple target measuring points to obtain the linear regression parameter.

In B2, the mode vibration parameter is determined based on the measuring point mode, the linear regression parameter and the regression equation expression.

After the linear regression parameter is determined, since the regression equation expression is also determined, a determined regression equation can be obtained by substituting the linear regression parameter into the regression equation expression, and the mode vibration parameter can be calculated by substituting the measuring point mode into the regression equation.

In S210, an interpolation vibration parameter of the to-be-estimated measuring point is determined based on measuring point coordinates corresponding to the to-be-estimated measuring point and in combination with the coordinates of the each target measuring point and the target vibration parameter of the each target measuring point.

In the embodiment, the measuring point coordinates may be understood as the coordinates of the to-be-estimated measuring point, and the coordinate dimension of the measuring point coordinates is the same as the coordinate dimension of the target measuring point.

For example, linear regression calculation is performed on the coordinates of the each target measuring point and the target vibration parameter of the each target measuring point to obtain the relevant parameter of the linear regression, and then the interpolation vibration parameter is calculated according to the relevant parameter of the linear regression and the measuring point coordinates.

In an optional embodiment of the embodiment, the determination of the interpolation vibration parameter of the to-be-estimated measuring point based on the measuring point coordinates corresponding to the to-be-estimated measuring point and in combination with the coordinates of the each target measuring point and the target vibration parameter of the each target measuring point includes steps described below.

In C1, linear regression calculation is performed according to the coordinates of the each target measuring point and the target vibration parameter of the each target measuring point and in combination with a given fitting equation expression to determine a fitting parameter.

In the embodiment, the fitting parameter may be understood as a parameter of a fitting equation, for example, a fitting coefficient, an offset, etc. In the embodiment, two-dimensional coordinates are taken as an example, and the corresponding fitting equation expression may be that $Z=V_1 M_{n1}+V_2 M_{n2}+b$, where Z represent the vibration parameter, $V_1$ to $V_2$ and b represent fitting parameters, $V_1$ to $V_2$ represent fitting coefficients, b represent an offset, and $M_{n1}$ and $M_{n2}$ represent the abscissa and the ordinate of the n-th structure measuring point, respectively. For each target measuring point, the corresponding coordinates and the corresponding target vibration parameter are substituted into corresponding parameter positions in the fitting equation expression, and fitting calculation is performed according to coordinates and target vibration parameters corresponding to multiple target measuring points to obtain the fitting parameter. The change of the vibration plane is determined in real time according to the target vibration parameters of the target measuring points, and the vibration plane is fitted in real time.

In C2, the interpolation vibration parameter is determined based on the measuring point coordinates, the fitting parameter and the fitting equation expression.

After the fitting parameter is determined, since the fitting equation expression is also determined, a determined fitting equation can be obtained by substituting the fitting parameter into the fitting equation expression, and the interpolation vibration parameter can be calculated by substituting the measuring point coordinates into the fitting equation.

In S211, the mode vibration parameter and the interpolation vibration parameter are input into a predetermined target integrated learning model.

In the embodiment, the target integrated learning model may be understood as a model that performs a comprehensive operation according to multiple vibration parameters to obtain an output result. The target integrated learning model in the present application performs a weighted sum on the mode vibration parameter and the interpolation vibration parameter to obtain a final result as an estimated result, and each weight value is determined in the manner of model training to obtain an optimal weighting coefficient.

For example, the model is pre-trained, and in the process of training, parameters of the model are continuously adjusted according to a loss function, finally the target integrated learning model satisfying requirements is obtained, and the training is completed. Data may be directly input into the trained target integrated learning model, and the estimated result is obtained according to learning experience. The mode vibration parameter and the interpolation vibration parameter are input into the predetermined target integrated learning model, and the target integrated learning model processes the mode vibration parameter and the interpolation vibration parameter according to determined model parameters to obtain the estimated result, and outputs the estimated result as the output result of the target integrated learning model.

In S212, the output result of the target integrated learning model is used as an estimated vibration parameter.

In an optional embodiment of the embodiment, the target integrated learning model is trained by the following steps D1 to D4.

In D1, a training mode vibration parameter, a training interpolation vibration parameter and a corresponding standard vibration parameter are used as a training sample.

In the embodiment, the training mode vibration parameter may be understood as a mode vibration parameter used during model training; and the training interpolation vibration parameter may be understood as an interpolation vibration parameter used during model training. The standard vibration parameter may be understood as a vibration parameter serving as a reference standard during model training.

For example, data such as coordinates, modes and vibration parameters of several structure measuring points on the to-be-measured structure are predetermined. One structure measuring point of the several structure measuring points is selected to perform the first training, structure measuring points associated with the one structure measuring point are determined, coordinates, modes and vibration parameters corresponding to the structure measuring points are determined, and the training mode vibration parameter and the training interpolation vibration parameter are further determined; the same manner is used here of determining the target measuring point, the mode vibration parameter and the interpolation vibration parameter in the embodiment of the present application. The training mode vibration parameter corresponding to one structure measuring point, the training interpolation vibration parameter corresponding to the one structure measuring point and a standard vibration parameter corresponding to the structure measuring point are used as a training sample.

In D2, a training sample under a current iteration is input into a given to-be-trained network model to obtain a corresponding pre-estimated vibration parameter.

In the embodiment, the to-be-trained network model may be understood as an untrained network model. The pre-estimated vibration parameter may be understood as a vibration parameter obtained by comprehensively processing by the to-be-trained network model according to the training mode vibration parameter and the training interpolation vibration parameter, and, essentially, is a vibration parameter obtained by estimation.

For example, the training sample is input into the to-be-trained network model, and the to-be-trained network model performs a comprehensive operation according to the input training mode vibration parameter and the input training interpolation vibration parameter, and performs calculation according to corresponding weighting coefficients to obtain the estimated vibration parameter.

In D3, a loss function is obtained by using a given loss function expression in combination with the pre-estimated vibration parameter and the corresponding standard vibration parameter.

The pre-estimated vibration parameter obtained under the current iteration and the corresponding standard vibration parameter are substituted into the loss function expression for calculation to obtain the loss function. The loss function may be one loss function, or may be a final loss function obtained by fitting multiple loss functions.

In D4, the to-be-trained network model is backpropagated based on the loss function to obtain a to-be-trained network model for a next iteration until an iteration convergence condition is satisfied to obtain the target integrated learning model.

In the process of training the neural network model, parameters of the model are continuously updated and adjusted in the backpropagation method until the output of the model is consistent with the target. After the loss function is determined, the to-be-trained network model is backpropagated through the loss function until the target integrated learning model satisfying the convergence condition is obtained. The specific backpropagation process is not limited in the embodiment of the present disclosure and may be set according to specific cases.

Figure 3:
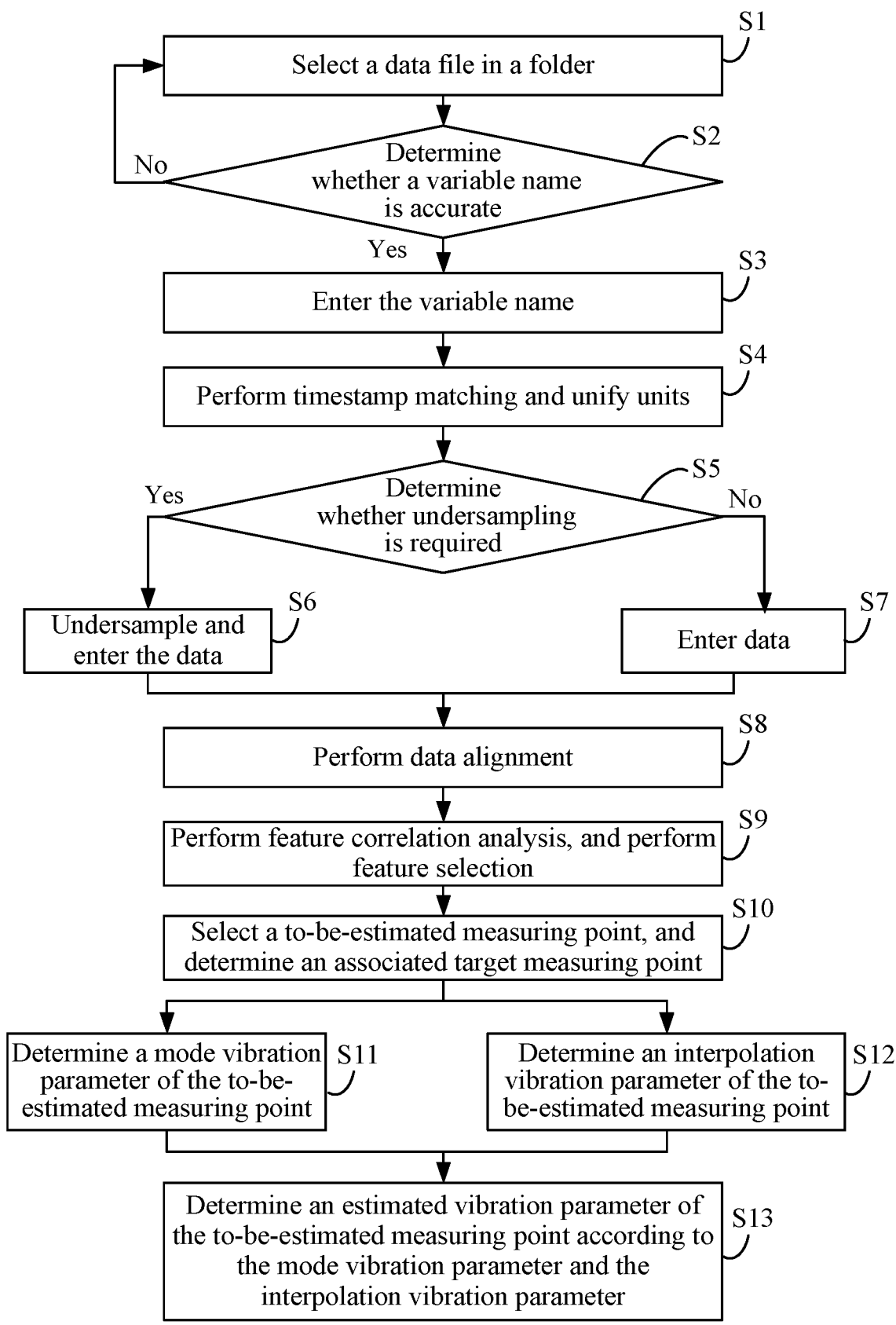
FIG. 3 is a diagram illustrating the implementation of a method for estimating structural vibration in real time according to embodiment two of the present disclosure.

Exemplarily, FIG. 3 is a diagram illustrating the implementation of a method for estimating structural vibration in real time according to an embodiment of the present disclosure.

In S1, a data file in a folder is selected.

The folder generally stores multiple data files, and a to-be-entered data file, that is, a data file containing the required vibration parameter, is selected from the folder.

In S2, whether a variable name is accurate is determined. If the variable name is accurate, S3 is executed; if the variable name is not accurate, S1 is returned to and executed.

Whether the variable name in the data file is the required type of the vibration parameter is determined. The purpose of this step is to ensure the accuracy of the entered data and thus to avoid data entry errors. Since the volume of data in the data file is generally very large, if an entry error occurs, re-entry is required, which wastes time and reduces work efficiency. Therefore, whether the variable name is accurate is determined first. If the variable name is accurate, subsequent data entry can be performed; if the variable name is not accurate, it is required to return to S1 to reselect a data file.

In S3, the variable name is entered.

In S4, timestamp matching is performed and units are unified.

Units of timestamps of data are unified, and then matching and alignment is performed on the first timestamp.

In S5, whether undersampling is required is determined. If undersampling is required, S6 is executed; if undersampling is not required, S7 is executed.

In S6, data is undersampled and entered, and S8 is executed.

In S7, data is entered.

The data file may have an excessive volume of data; however, such a large volume of data is not required during model training at this time. Therefore, the data is extracted in the manner of undersampling, and then data entry is performed.

In S8, data alignment is performed.

The volume of data is adjusted to be the same as each other, and then the data is aligned sequentially.

In S9, feature correlation analysis is performed, and feature selection is performed.

One structure measuring point of structure measuring points is selected as a current to-be-selected structure measuring point, feature correlation analysis is performed on a vibration parameter of the current to-be-selected structure measuring point and vibration parameters of other structure measuring points, a vibration parameter having a relatively high correlation degree is selected, an alternative data set of the current to-be-selected structure measuring point is formed, thereby an association measuring point corresponding to the current to-be-selected structure measuring point is determined, and a corresponding relationship between the current to-be-selected structure measuring point and each association measuring point is established.

In S10, a to-be-estimated measuring point is selected, and an associated target measuring point is determined.

In S11, a mode vibration parameter of the to-be-estimated measuring point is determined.

In S12, an interpolation vibration parameter of the to-be-estimated measuring point is determined.

In S13, an estimated vibration parameter of the to-be-estimated measuring point is determined according to the mode vibration parameter and the interpolation vibration parameter.

It is to be understood that no strict sequence is set for the execution of S11 and S12, and S11 and S12 may be performed simultaneously or sequentially. The method provided in the present application may also calculate the accuracy of the vibration parameter estimation by calculating a percent error of a total root mean square (RMS) value.

The embodiment of the present disclosure provides a method for estimating structural vibration in real time, which solves the problem that the vibration parameter cannot be estimated in real time through the vibration parameter estimation method in the related art. The target measuring point associated with the to-be-estimated measuring point is determined, the mode vibration parameter of the to-be-estimated measuring point and the interpolation vibration parameter of the to-be-estimated measuring point are estimated according to the coordinates of the target measuring point, the target mode of the target measuring point and the target vibration parameter of the target measuring point, and comprehensive data processing is performed on the mode vibration parameter and the interpolation vibration parameter to obtain the estimated vibration parameter of the to-be-estimated measuring point. In this manner, the purpose of real-time estimation of the vibration parameter of the to-be-estimated measuring point according to the vibration parameter of the associated target measuring point is achieved, thus the estimated vibration parameter of the to-be-estimated measuring point can be estimated in real time, and users of the equipment can understand the structural vibration of the equipment in real time, so that technical support is provided for further improving the operation reliability and safety of various types of equipment. Moreover, the timeliness and accuracy of the data are ensured, the data processing time is saved, the reaction speed is improved, and the safety of the equipment is ensured.

Embodiment Three

Figure 4:
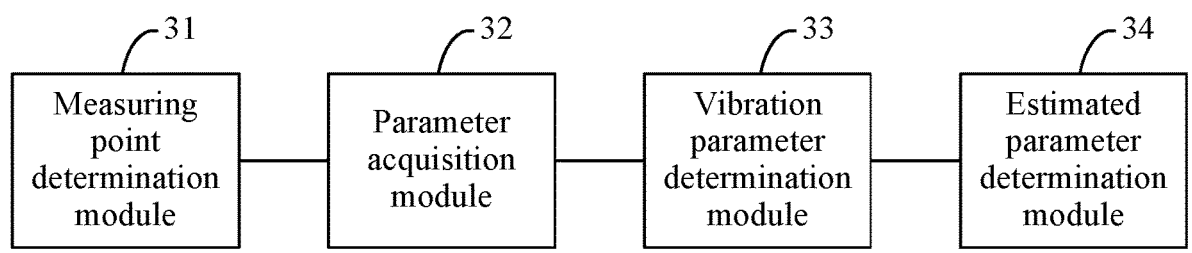
FIG. 4 is a diagram illustrating the structure of an apparatus for estimating structural vibration in real time according to embodiment three of the present disclosure.

FIG. 4 is a diagram illustrating the structure of an apparatus for estimating structural vibration in real time according to embodiment three of the present disclosure. The apparatus includes a measuring point determination module 31, a parameter acquisition module 32, a vibration parameter determination module 33 and an estimated parameter determination module 34.

The measuring point determination module 31 is configured to acquire a to-be-estimated measuring point of a to-be-measured structure, and determine at least one target measuring point associated with the to-be-estimated measuring point. The parameter acquisition module 32 is configured to acquire coordinates corresponding to each target measuring point of the at least one target measuring point, a target mode corresponding to the each target measuring point and a target vibration parameter corresponding to the each target measuring point. The vibration parameter determination module 33 is configured to determine a mode vibration parameter of the to-be-estimated measuring point and an interpolation vibration parameter of the to-be-estimated measuring point based on the to-be-estimated measuring point and in combination with the target mode of the each target measuring point, the target vibration parameter of the each target measuring point and the coordinates of the each target measuring point. The estimated parameter determination module 34 is configured to determine an estimated vibration parameter of the to-be-estimated measuring point according to the mode vibration parameter and the interpolation vibration parameter.

The embodiment of the present disclosure provides an apparatus for estimating structural vibration in real time, which solves the problem that the vibration parameter cannot be estimated in real time through the vibration parameter estimation method in the related art. The target measuring point associated with the to-be-estimated measuring point is determined, the mode vibration parameter of the to-be-estimated measuring point and the interpolation vibration parameter of the to-be-estimated measuring point are estimated according to the coordinates of the target measuring point, the target mode of the target measuring point and the target vibration parameter of the target measuring point, and comprehensive data processing is performed on the mode vibration parameter and the interpolation vibration parameter to obtain the estimated vibration parameter of the to-be-estimated measuring point. In this manner, the purpose of real-time estimation of the vibration parameter of the to-be-estimated measuring point according to the vibration parameter of the associated target measuring point is achieved, and thus the estimated vibration parameter of the to-be-estimated measuring point can be estimated in real time, so that the timeliness and accuracy of data are ensured, the data processing time is saved, the reaction speed is improved, and the safety of the equipment is ensured.

Further, the apparatus further includes a data acquisition module, a measuring point selection module, a filtering module, a corresponding relationship establishment module and a returning module.

The data acquisition module is configured to acquire a data file, process the data file according to a predetermined file attribute feature, and determine at least one raw data set, where each raw data set of the at least one raw data set corresponds to a structure measuring point of the to-be-measured structure.

The measuring point selection module is configured to select one structure measuring point from the at least one structure measuring point of the to-be-measured structure as a current to-be-selected structure measuring point.

The filtering module is configured to filter out an alternative data set associated with the current to-be-selected structure measuring point from the at least one raw data set, and determine a structure measuring point corresponding to the alternative data set as an association measuring point.

The corresponding relationship establishment module is configured to establish a corresponding relationship between the current to-be-selected structure measuring point and each association measuring point.

The returning module is configured to return to the operation of selecting the current to-be-selected structure measuring point until all structure measuring points are selected.

Further, the filtering module includes a raw data set determination unit, an alignment unit, a coefficient determination unit, a coefficient filtering unit and an alternative data set determination unit.

The raw data set determination unit is configured to determine a to-be-selected raw data set corresponding to the current to-be-selected structure measuring point, and determine a measuring point raw data set corresponding to each of remaining structure measuring points.

The alignment unit is configured to align data in the to-be-selected raw data set with data in each measuring point raw data set.

The coefficient determination unit is configured to determine a correlation coefficient of the aligned to-be-selected raw data set and the each aligned measuring point raw data set.

The coefficient filtering unit is configured to filter out a preset number of alternative correlation coefficients from correlation coefficients.

The alternative data set determination unit is configured to use each measuring point raw data set corresponding to each alternative correlation coefficient as the alternative data set.

Further, the alignment unit is configured to for the each measuring point raw data set, unify a unit of a timestamp of the data in the to-be-selected raw data set and a unit of a timestamp of the data in the each measuring point raw data set; perform timestamp matching on the data in the to-be-selected raw data set and the data in the each measuring point raw data set; and adjust a volume of the data in the matched to-be-selected raw data set and a volume of the data in the each matched measuring point raw data set to be the same, and sequentially align the data in the matched to-be-selected raw data set with the data in the each matched measuring point raw data set.

Further, the parameter acquisition module 32 is configured to determine the target mode of the each target measuring point according to the coordinates of the each target measuring point and in combination with a predetermined finite element model.

Further, the vibration parameter determination module 33 includes a mode parameter determination unit and an interpolation parameter determination unit.

The mode parameter determination unit is configured to determine the mode vibration parameter of the to-be-estimated measuring point based on a measuring point mode corresponding to the to-be-estimated measuring point and in combination with the target mode of the each target measuring point and the target vibration parameter of the each target measuring point.

The interpolation parameter determination unit is configured to determine the interpolation vibration parameter of the to-be-estimated measuring point based on measuring point coordinates corresponding to the to-be-estimated measuring point and in combination with the coordinates of the each target measuring point and the target vibration parameter of the each target measuring point.

Further, the mode parameter determination unit is configured to perform linear regression calculation according to each target mode and each target vibration parameter and in combination with a given regression equation expression to determine a linear regression parameter; and determine the mode vibration parameter based on the measuring point mode, the linear regression parameter and the regression equation expression.

Further, the interpolation parameter determination unit is configured to perform linear regression calculation according to the coordinates of the each target measuring point and the target vibration parameter of the each target measuring point and in combination with a given fitting equation expression to determine a fitting parameter; and determine the interpolation vibration parameter based on the measuring point coordinates, the fitting parameter and the fitting equation expression.

Further, the estimated parameter determination module 34 includes an input unit and an output unit.

The input unit is configured to input the mode vibration parameter and the interpolation vibration parameter into a predetermined target integrated learning model.

The output unit is configured to use an output result of the target integrated learning model as the estimated vibration parameter.

Further, the apparatus further includes a sample determination module, a pre-estimated parameter determination module, a loss function determination module and a target model determination module.

The sample determination module is configured to use a training mode vibration parameter, a training interpolation vibration parameter and a corresponding standard vibration parameter as a training sample.

The pre-estimated parameter determination module is configured to input a training sample under a current iteration into a given to-be-trained network model to obtain a corresponding pre-estimated vibration parameter.

The loss function determination module is configured to use a given loss function expression in combination with the pre-estimated vibration parameter and the corresponding standard vibration parameter to obtain a loss function.

The target model determination module is configured to backpropagate the given to-be-trained network model based on the loss function to obtain a to-be-trained network model for a next iteration until an iteration convergence condition is satisfied and the target integrated learning model is obtained.

The apparatus for estimating structural vibration in real time provided in the embodiment of the present disclosure may execute the method for estimating structural vibration in real time according to any embodiment of the present disclosure, and has functional modules for and beneficial effects of executing the method.

Embodiment Four

Figure 5:
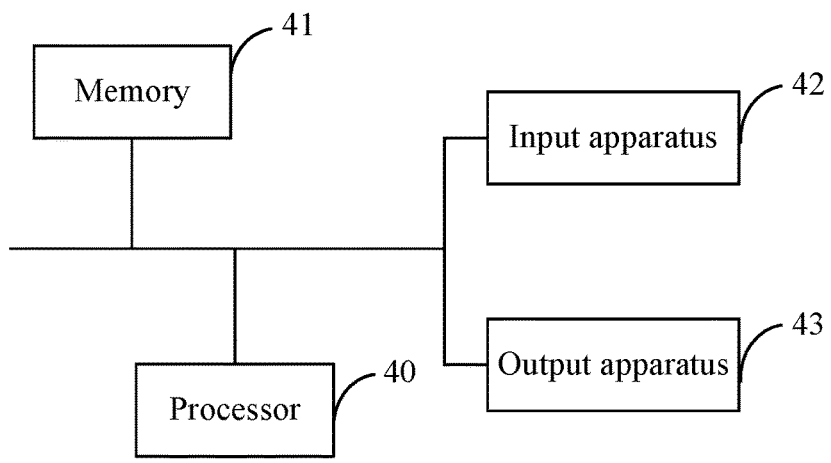
FIG. 5 is diagram illustrating the structure of a computer device according to embodiment four of the present disclosure.

FIG. 5 is diagram illustrating the structure of a computer device according to embodiment four of the present disclosure. As shown in FIG. 5, the device includes a processor 40, a memory 41, an input apparatus 42 and an output apparatus 43. One or more processors 40 may be disposed in the device, and one processor 40 is used as an example in FIG. 5. The processor 40, the memory 41, the input apparatus 42, and the output apparatus 43 in the device may be connected through a bus or in other manners. In FIG. 5, the connection through the bus is used as an example.

As a computer-readable storage medium, the memory 41 may be configured to store software programs and computer-executable programs and modules, such as program instructions/modules (for example, the measuring point determination module 31, the parameter acquisition module 32, the vibration parameter determination module 33 and the estimated parameter determination module 34 in the apparatus for estimating structural vibration in real time) corresponding to the method for estimating structural vibration in real time in the embodiments of the present disclosure. The processor 40 executes software programs, instructions and modules stored in the memory 41 to execute various functional applications and data processing of the device, that is, to implement the preceding method for estimating structural vibration in real time.

The memory 41 may mainly include a program storage area and a data storage area. The program storage area may store an operating system and an application program required for implementing at least one function while the data storage area may store data created depending on use of terminals. In addition, the memory 41 may include a high-speed random-access memory and may also include a non-volatile memory such as at least one disk memory, a flash memory, or another non-volatile solid-state memory. In some examples, the memory 41 may further include memories located remotely relative to the processor 40, and these remote memories may be connected to the device via networks. Examples of the preceding networks include, but are not limited to, the Internet, an intranet, a local area network, a mobile communication network and a combination thereof.

The input apparatus 42 may be used for receiving input digital or character information and for generating key signal input related to user settings and function control of the device. The output apparatus 43 may include display devices such as a display screen.

Embodiment Five

Embodiment five of the present disclosure further provides a storage medium including computer-executable instructions which, when executed by a computer processor, are configured to execute a method for estimating structural vibration in real time. The method includes steps described below.

A to-be-estimated measuring point of a to-be-measured structure is acquired, and at least one target measuring point associated with the to-be-estimated measuring point is determined.

Coordinates corresponding to each target measuring point of the at least one target measuring point, a target mode corresponding to the each target measuring point and a target vibration parameter corresponding to the each target measuring point are determined.

A mode vibration parameter of the to-be-estimated measuring point and an interpolation vibration parameter of the to-be-estimated measuring point are determined based on the to-be-estimated measuring point and in combination with the target mode of the each target measuring point, the target vibration parameter of the each target measuring point and the coordinates of the each target measuring point.

An estimated vibration parameter of the to-be-estimated measuring point is determined according to the mode vibration parameter and the interpolation vibration parameter.

Of course, for the storage medium including computer-executable instructions provided in the embodiment of the present disclosure, the computer-executable instructions execute not only the preceding method operations but also related operations in the method for estimating structural vibration in real time provided in any embodiment of the present disclosure.

From the preceding description of embodiments, it will be apparent to those skilled in the art that the present disclosure may be implemented by means of software and necessary general-purpose hardware or may of course be implemented by hardware, but in many cases the former is a preferred embodiment. Based on this understanding, the technical solutions provided in the present disclosure substantially, or the part contributing to the related art, may be embodied in the form of a software product. The software product may be stored in a computer-readable storage medium, such as a computer floppy disk, a read-only memory (ROM), a random-access memory (RAM), a flash memory, a hard disk or an optical disc, and includes several instructions for enabling a computer device (which may be a personal computer, a server or a network device) to execute the method according to each embodiment of the present disclosure.

It is to be noted that units and modules included in the embodiment of the apparatus for estimating structural vibration in real time are just divided according to functional logic but are not limited to such division, as long as the corresponding functions can be implemented. In addition, the specific names of the functional units are just used for distinguishing between each other and are not intended to limit the scope of the present disclosure.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A method for estimating structural vibration in real time, applied to a computer device, comprising:
acquiring a to-be-estimated measuring point of a to-be-measured structure, and determining at least one target measuring point associated with the to-be-estimated measuring point, wherein the to-be-measured structure is a device having a requirement of vibration parameter estimation and the computer device is installed in the to-be-measured structure;
determining coordinates corresponding to each target measuring point of the at least one target measuring point, a target mode corresponding to the each target measuring point and a target vibration parameter corresponding to the each target measuring point;

determining a mode vibration parameter of the to-be-estimated measuring point and an interpolation vibration parameter of the to-be-estimated measuring point based on the to-be-estimated measuring point and in combination with the target mode of the each target measuring point, the target vibration parameter of the each target measuring point and the coordinates of the each target measuring point; and determining an estimated vibration parameter of the to-be-estimated measuring point according to the mode vibration parameter and the interpolation vibration parameter;

further comprising:

acquiring a data file, processing the data file according to a predetermined file attribute feature, and determining at least one raw data set, wherein each raw data set of the at least one raw data set corresponds to a structure measuring point of the to-be-measured structure;

selecting one structure measuring point from the at least one structure measuring point of the to-be-measured structure as a current selected structure measuring point;

filtering out an alternative data set associated with the current selected structure measuring point from the at least one raw data set, and determining a structure measuring point corresponding to the alternative data set as an association measuring point;

establishing a corresponding relationship between the current selected structure measuring point and each association measuring point; and returning to the operation of selecting the current selected structure measuring point until all structure measuring points are selected;

accordingly, acquiring the to-be-estimated measuring point of the to-be-measured structure, and determining the at least one target measuring point associated with the to-be-estimated measuring point, comprises:

acquiring, from the structure measuring points, the to-be-estimated measuring point of the to-be-measured structure, and determining, from the structure measuring points, the at least one target measuring point associated with the to-be-estimated measuring point;

wherein filtering out the alternative data set associated with the current selected structure measuring point from the at least one raw data set comprises:

determining a to-be-selected raw data set corresponding to the current selected structure measuring point, and determining a measuring point raw data set corresponding to each of remaining structure measuring points;

aligning data in the to-be-selected raw data set with data in the measuring point raw data set;

determining a correlation coefficient of the aligned to-be-selected raw data set and the aligned measuring point raw data set;

filtering out a preset number of alternative correlation coefficients from correlation coefficients; and using a measuring point raw data set corresponding to the preset number of alternative correlation coefficients as the alternative data set.

2. The method according to claim 1, wherein aligning the data in the to-be-selected raw data set with the data in the measuring point raw data set comprises:

for the measuring point raw data set, unifying a unit of a timestamp of the data in the to-be-selected raw data set and a unit of a timestamp of the data in the measuring point raw data set;

performing timestamp matching on the data in the to-be-selected raw data set and the data in the measuring point raw data set; and adjusting a volume of the data in the matched to-be-selected raw data set and a volume of the data in the matched measuring point raw data set to be the same, and sequentially aligning the data in the matched to-be-selected raw data set with the data in the matched measuring point raw data set.

3. The method according to claim 1, wherein determining the target mode corresponding to the each target measuring point comprises:

determining the target mode of the each target measuring point according to the coordinates of the each target measuring point and in combination with a predetermined finite element model.

4. The method according to claim 1, wherein determining the mode vibration parameter of the to-be-estimated measuring point and the interpolation vibration parameter of the to-be-estimated measuring point based on the to-be-estimated measuring point and in combination with the target mode of the each target measuring point, the target vibration parameter of the each target measuring point and the coordinates of the each target measuring point comprises:

determining the mode vibration parameter of the to-be-estimated measuring point based on a measuring point mode corresponding to the to-be-estimated measuring point and in combination with the target mode of the each target measuring point and the target vibration parameter of the each target measuring point; and determining the interpolation vibration parameter of the to-be-estimated measuring point based on measuring point coordinates corresponding to the to-be-estimated measuring point and in combination with the coordinates of the each target measuring point and the target vibration parameter of the each target measuring point.

5. The method according to claim 4, wherein determining the mode vibration parameter of the to-be-estimated measuring point based on the measuring point mode corresponding to the to-be-estimated measuring point and in combination with the target mode of the each target measuring point and the target vibration parameter of the each target measuring point comprises:

performing linear regression calculation according to the target mode and the target vibration parameter and in combination with a given regression equation expression to determine a linear regression parameter; and determining the mode vibration parameter based on the measuring point mode, the linear regression parameter and the regression equation expression.

6. The method according to claim 4, wherein determining the interpolation vibration parameter of the to-be-estimated measuring point based on the measuring point coordinates corresponding to the to-be-estimated measuring point and in combination with the coordinates of the each target measuring point and the target vibration parameter of the each target measuring point comprises:

performing linear regression calculation according to the coordinates of the each target measuring point and the target vibration parameter of the each target measuring point and in combination with a given fitting equation expression to determine a fitting parameter; and determining the interpolation vibration parameter based on the measuring point coordinates, the fitting parameter and the fitting equation expression.

7. The method according to claim 1, wherein determining the estimated vibration parameter of the to-be-estimated measuring point according to the mode vibration parameter and the interpolation vibration parameter comprises:
inputting the mode vibration parameter and the interpolation vibration parameter into a predetermined target integrated learning model; and
using an output result of the target integrated learning model as the estimated vibration parameter.

8. The method according to claim 7, wherein the target integrated learning model is trained by the following steps:
using a training mode vibration parameter, a training interpolation vibration parameter and a corresponding standard vibration parameter as a training sample;
inputting a training sample under a current iteration into a given to-be-trained network model to obtain a corresponding pre-estimated vibration parameter;
obtain a loss function by using a given loss function expression in combination with the pre-estimated vibration parameter and the corresponding standard vibration parameter; and
backpropagating the given to-be-trained network model based on the loss function to obtain a to-be-trained network model for a next iteration until an iteration convergence condition is satisfied to obtain the target integrated learning model.

9. A computer device, comprising:
one or more processors; and
a memory configured to store one or more programs;
wherein the one or more programs, when executed by the one or more processors, cause the one or more processors to implement the following steps:
acquiring a to-be-estimated measuring point of a to-be-measured structure, and determining at least one target measuring point associated with the to-be-estimated measuring point, wherein, the to-be-measured structure is a device having a requirement of vibration parameter estimation, and the computer device is installed in the to-be-measured structure;
determining coordinates corresponding to each target measuring point of the at least one target measuring point, a target mode corresponding to the each target measuring point and a target vibration parameter corresponding to the each target measuring point;
determining a mode vibration parameter of the to-be-estimated measuring point and an interpolation vibration parameter of the to-be-estimated measuring point based on the to-be-estimated measuring point and in combination with the target mode of the each target measuring point, the target vibration parameter of the each target measuring point and the coordinates of the each target measuring point; and
determining an estimated vibration parameter of the to-be-estimated measuring point according to the mode vibration parameter and the interpolation vibration parameter;
wherein the one or more programs, when executed by the one or more processors, further cause the one or more processors to implement the following steps:
acquiring a data file, processing the data file according to a predetermined file attribute feature, and determining at least one raw data set, wherein each raw data set of the at least one raw data set corresponds to a structure measuring point of the to-be-measured structure;
selecting one structure measuring point from the at least one structure measuring point of the to-be-measured structure as a current selected structure measuring point;
filtering out an alternative data set associated with the current selected structure measuring point from the at least one raw data set, and determining a structure measuring point corresponding to the alternative data set as an association measuring point;
establishing a corresponding relationship between the current selected structure measuring point and each association measuring point; and
returning to the operation of selecting the current selected structure measuring point until all structure measuring points are selected;
accordingly, acquiring the to-be-estimated measuring point of the to-be-measured structure, and determining the at least one target measuring point associated with the to-be-estimated measuring point, comprises:
acquiring, from the structure measuring points, the to-be-estimated measuring point of the to-be-measured structure, and determining, from the structure measuring points, the at least one target measuring point associated with the to-be-estimated measuring point;
wherein filtering out the alternative data set associated with the current selected structure measuring point from the at least one raw data set comprises:
determining a to-be-selected raw data set corresponding to the current selected structure measuring point, and determining a measuring point raw data set corresponding to each of remaining structure measuring points;
aligning data in the to-be-selected raw data set with data in the measuring point raw data set;
determining a correlation coefficient of the aligned to-be-selected raw data set and the aligned measuring point raw data set;
filtering out a preset number of alternative correlation coefficients from correlation coefficients; and
using a measuring point raw data set corresponding to the preset number of alternative correlation coefficients as the alternative data set.

10. The device according to claim 9, wherein aligning the data in the to-be-selected raw data set with the data in the measuring point raw data set comprises:
for the measuring point raw data set, unifying a unit of a timestamp of the data in the to-be-selected raw data set and a unit of a timestamp of the data in the measuring point raw data set;
performing timestamp matching on the data in the to-be-selected raw data set and the data in the measuring point raw data set; and
adjusting a volume of the data in the matched to-be-selected raw data set and a volume of the data in the matched measuring point raw data set to be the same, and sequentially aligning the data in the matched to-be-selected raw data set with the data in the matched measuring point raw data set.

11. The device according to claim 9, wherein determining the target mode corresponding to the each target measuring point comprises:
determining the target mode of the each target measuring point according to the coordinates of the each target measuring point and in combination with a predetermined finite element model.

12. The device according to claim 9, wherein determining the mode vibration parameter of the to-be-estimated measuring point and the interpolation vibration parameter of the to-be-estimated measuring point based on the to-be-estimated measuring point and in combination with the target mode of the each target measuring point, the target vibration parameter of the each target measuring point and the coordinates of the each target measuring point comprises:
    determining the mode vibration parameter of the to-be-estimated measuring point based on a measuring point mode corresponding to the to-be-estimated measuring point and in combination with the target mode of the each target measuring point and the target vibration parameter of the each target measuring point; and
    determining the interpolation vibration parameter of the to-be-estimated measuring point based on measuring point coordinates corresponding to the to-be-estimated measuring point and in combination with the coordinates of the each target measuring point and the target vibration parameter of the each target measuring point.

13. The device according to claim 12, wherein determining the mode vibration parameter of the to-be-estimated measuring point based on the measuring point mode corresponding to the to-be-estimated measuring point and in combination with the target mode of the each target measuring point and the target vibration parameter of the each target measuring point comprises:
    performing linear regression calculation according to the target mode and the target vibration parameter and in combination with a given regression equation expression to determine a linear regression parameter; and
    determining the mode vibration parameter based on the measuring point mode, the linear regression parameter and the regression equation expression.

14. The device according to claim 12, wherein determining the interpolation vibration parameter of the to-be-estimated measuring point based on the measuring point coordinates corresponding to the to-be-estimated measuring point and in combination with the coordinates of the each target measuring point and the target vibration parameter of the each target measuring point comprises:
    performing linear regression calculation according to the coordinates of the each target measuring point and the target vibration parameter of the each target measuring point and in combination with a given fitting equation expression to determine a fitting parameter; and
    determining the interpolation vibration parameter based on the measuring point coordinates, the fitting parameter and the fitting equation expression.

15. The device according to claim 9, wherein determining the estimated vibration parameter of the to-be-estimated measuring point according to the mode vibration parameter and the interpolation vibration parameter comprises:
    inputting the mode vibration parameter and the interpolation vibration parameter into a predetermined target integrated learning model; and
    using an output result of the target integrated learning model as the estimated vibration parameter.

16. A non-transitory computer-readable storage medium storing computer programs which, when executed by a processor, implement the following steps:
    acquiring a to-be-estimated measuring point of a to-be-measured structure, and determining at least one target measuring point associated with the to-be-estimated measuring point, wherein, the to-be-measured structure is a device having a requirement of vibration parameter estimation, and the computer device is installed in the to-be-measured structure;
    determining coordinates corresponding to each target measuring point of the at least one target measuring point, a target mode corresponding to the each target measuring point and a target vibration parameter corresponding to the each target measuring point;
    determining a mode vibration parameter of the to-be-estimated measuring point and an interpolation vibration parameter of the to-be-estimated measuring point based on the to-be-estimated measuring point and in combination with the target mode of the each target measuring point, the target vibration parameter of the each target measuring point and the coordinates of the each target measuring point; and
    determining an estimated vibration parameter of the to-be-estimated measuring point according to the mode vibration parameter and the interpolation vibration parameter;
    further comprising:
    acquiring a data file, processing the data file according to a predetermined file attribute feature, and determining at least one raw data set, wherein each raw data set of the at least one raw data set corresponds to a structure measuring point of the to-be-measured structure;
    selecting one structure measuring point from the at least one structure measuring point of the to-be-measured structure as a current selected structure measuring point;
    filtering out an alternative data set associated with the current selected structure measuring point from the at least one raw data set, and determining a structure measuring point corresponding to the alternative data set as an association measuring point;
    establishing a corresponding relationship between the current selected structure measuring point and each association measuring point; and
    returning to the operation of selecting the current selected structure measuring point until all structure measuring points are selected;
    accordingly, acquiring the to-be-estimated measuring point of the to-be-measured structure, and determining the at least one target measuring point associated with the to-be-estimated measuring point, comprises:
    acquiring, from the structure measuring points, the to-be-estimated measuring point of the to-be-measured structure, and determining, from the structure measuring points, the at least one target measuring point associated with the to-be-estimated measuring point;
    wherein filtering out the alternative data set associated with the current selected structure measuring point from the at least one raw data set comprises:
    determining a to-be-selected raw data set corresponding to the current selected structure measuring point, and determining a measuring point raw data set corresponding to each of remaining structure measuring points;
    aligning data in the to-be-selected raw data set with data in the measuring point raw data set;
    determining a correlation coefficient of the aligned to-be-selected raw data set and the aligned measuring point raw data set;
    filtering out a preset number of alternative correlation coefficients from correlation coefficients; and
    using a measuring point raw data set corresponding to the preset number of alternative correlation coefficients as the alternative data set.

* * * * *